(12) United States Patent
Kwon (10) Patent No.: US 8,327,624 B2
(45) Date of Patent: Dec. 11, 2012

(54) SYSTEM FOR PURIFYING EXHAUST GAS

(75) Inventor: Soon Hyung Kwon, Gyunggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 478 days.

(21) Appl. No.: 12/512,864

(22) Filed: Jul. 30, 2009

(65) Prior Publication Data

US 2010/0139253 A1    Jun. 10, 2010

(30) Foreign Application Priority Data

Dec. 5, 2008  (KR) .................. 10-2008-0123537

(51) Int. Cl.
*F01N 3/00*    (2006.01)
(52) U.S. Cl. ............... 60/295; 60/286; 60/324
(58) Field of Classification Search ......... 60/295, 60/324
See application file for complete search history.

(56) References Cited

U.S. PATENT DOCUMENTS

| | | | |
|---|---|---|---|
| 5,584,265 A * | 12/1996 | Rao et al. ........... | 123/1 A |
| 2004/0144084 A1 * | 7/2004 | Hara .................. | 60/288 |
| 2005/0034449 A1 * | 2/2005 | Frieden et al. ...... | 60/284 |
| 2006/0059896 A1 * | 3/2006 | Liu et al. ............ | 60/286 |
| 2007/0175208 A1 * | 8/2007 | Bandl-Konrad et al. | 60/286 |

* cited by examiner

*Primary Examiner* — Thomas Denion
*Assistant Examiner* — Jason Shanske
(74) *Attorney, Agent, or Firm* — Morgan, Lewis & Bockius LLP (57) ABSTRACT

A system for purifying an exhaust gas may include a catalyzed particulate filter trapping particulate matters contained in the exhaust gas, a diesel oxidation catalyst oxidizing carbon monoxide and hydrocarbon in the exhaust gas, a selective catalyst reduction apparatus reducing nitrogen oxide contained in the exhaust gas, a dosing module located upstream of the selective catalyst reduction apparatus and dosing a reducing agent into the exhaust gas, and a control portion controlling an operation of an engine, wherein the catalyzed particulate filter, the diesel oxidation catalyst, the selective catalyst reduction apparatus, and the dosing module are mounted on an exhaust pipe, and the selective catalyst reduction apparatus is mounted downstream of the catalyzed particulate filter and the diesel oxidation catalyst, and wherein the control portion controls flow of the exhaust gas and the engine to raise an exhaust gas temperature if a heating mode enter condition is satisfied.

14 Claims, 5 Drawing Sheets

SYSTEM FOR PURIFYING EXHAUST GAS

CROSS-REFERENCE TO RELATED APPLICATION

The present application claims priority to Korean Patent Application No. 10-2008-0123537 filed on Dec. 5, 2008, the entire contents of which are incorporated herein for all purposes by this reference.

BACKGROUND OF THE INVENTION

1. Field of the Invention

The present invention relates to a system for purifying an exhaust gas. More particularly, the present invention relates to a system for purifying an exhaust gas that improves performance of purifying the exhaust gas by quickly raising an exhaust gas temperature to a temperature at which nitrogen oxide can react with a reducing agent in a selective catalyst reduction apparatus.

2. Description of Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe. The catalytic converter is a type of a diesel particulate filter (DPF) and purifies pollutants contained in the exhaust gas. A catalytic carrier for trapping particulate matter (PM) contained in the exhaust gas is in the catalytic converter, and the exhaust gas flowing out from the engine is purified through a chemical reaction therein.

One type of catalytic converters is a selective catalyst reduction (SCR) apparatus. In the selective catalyst reduction (SCR) apparatus, reducing agents such as urea, ammonia, carbon monoxide, and hydrocarbon (HC) react better with nitrogen oxide than oxygen.

According to a conventional system for purifying an exhaust gas, a catalyzed particulate filter, a diesel oxidation catalyst, and a selective catalyst reduction apparatus are sequentially mounted on an exhaust pipe from an engine. Therefore, the exhaust gas generated in the engine sequentially passes through the catalyzed particulate filter, the diesel oxidation catalyst, and the selective catalyst reduction apparatus, and noxious materials contained in the exhaust gas are removed. That is, the catalyzed particulate filter traps particulate matters (PM) contained in the exhaust gas, the diesel oxidation catalyst oxidizes carbon monoxide and hydrocarbon contained in the exhaust gas into carbon dioxide, and the selective catalyst reduction apparatus reduces nitrogen oxide contained in the exhaust gas into nitrogen gas.

Figure 5:
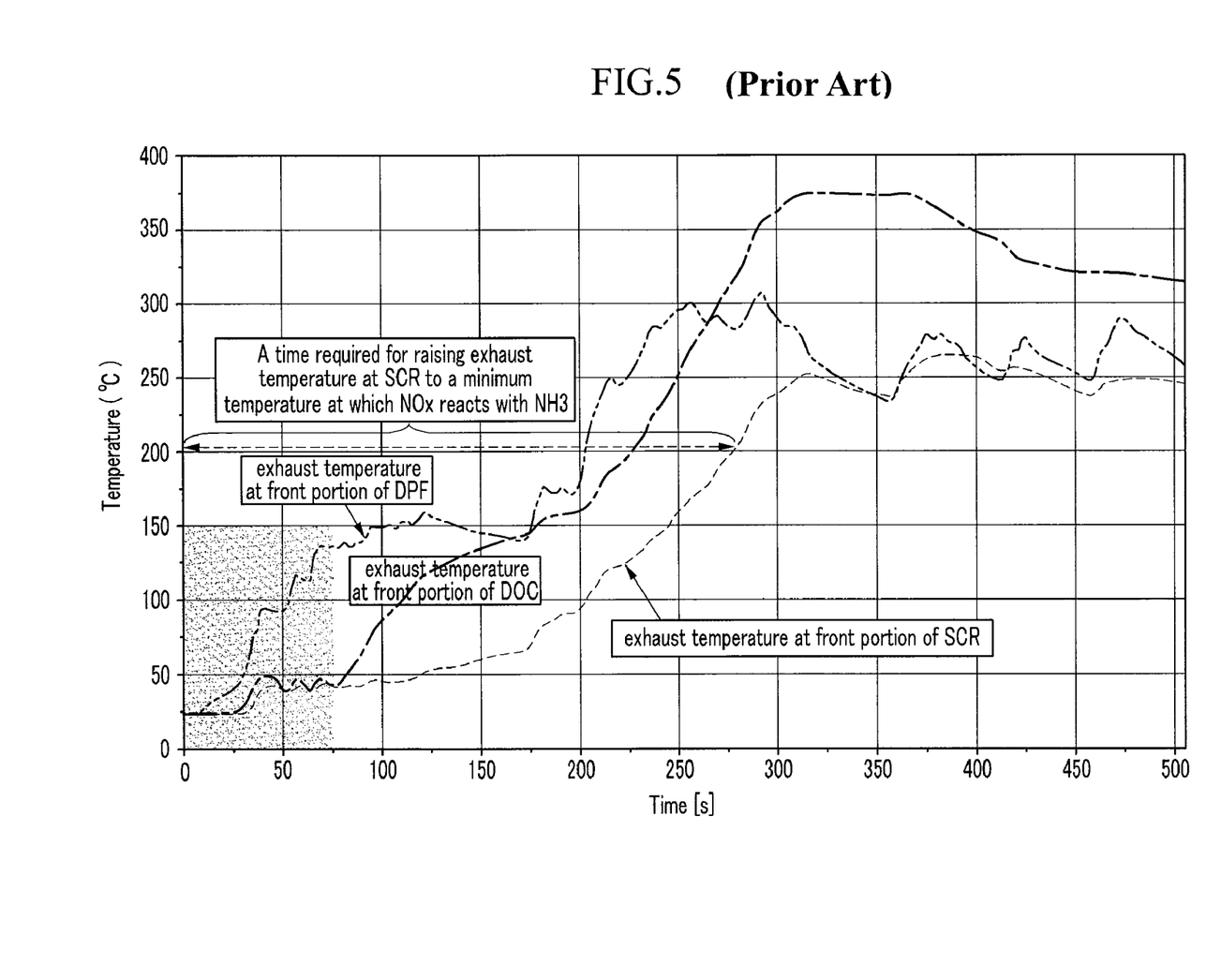
FIG. 5 is a graph showing an exhaust gas temperature at each portion of an exhaust pipe in a case that a conventional system for purifying an exhaust gas is used.

Meanwhile, in order for the nitrogen oxide to react with the reducing agent, an exhaust gas temperature at a front portion of the selective catalyst reduction apparatus is higher than or equal to 200° C. However, since the selective catalyst reduction apparatus is mounted on a rearmost exhaust pipe, long time (e.g., 270 seconds) is required for raising the exhaust gas temperature at the front portion of the selective catalyst reduction apparatus higher than 200° C., as shown in FIG. 5. Therefore, the nitrogen oxide contained in the exhaust gas is hardly reduced and is exhausted to the exterior before the exhaust gas temperature at the front portion of the selective catalyst reduction apparatus is higher than 200° C.

In addition, if the temperature of the exhaust gas generated in the engine is raised by increasing fuel injection amount or by post-injection, exhaust heat is hardly transmitted to the diesel oxidation catalyst and the selective catalyst reduction apparatus at an initial time of raising the exhaust gas temperature because of thermal capacity of the catalyzed particulate filter.

If the fuel injection amount is further increased, excessive hydrocarbon slip occurs in the catalyzed particulate filter.

Therefore, techniques for reducing hydrocarbon slip occurring in the catalyzed particulate filter and quickly raising the exhaust gas temperature at the front portion of the selective catalyst reduction apparatus should be developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a system for purifying an exhaust gas having advantages of improving performance of purifying the exhaust gas by quickly raising an exhaust gas temperature at a front portion of a selective catalyst reduction apparatus.

In an exemplary embodiment of the present invention, the system for purifying an exhaust gas may include a diesel particulate filer (DPF) trapping particulate matters (PM) contained in the exhaust gas, a diesel oxidation catalyst (DOC) oxidizing carbon monoxide and hydrocarbon contained in the exhaust gas, a selective catalyst reduction (SCR) apparatus reducing nitrogen oxide contained in the exhaust gas, a dosing module located upstream of the selective catalyst reduction apparatus and dosing a reducing agent into the exhaust gas, and a control portion controlling an operation of an engine, wherein the catalyzed particulate filter, the diesel oxidation catalyst, the selective catalyst reduction apparatus, and the dosing module are mounted on an exhaust pipe, and the selective catalyst reduction apparatus is mounted downstream of the catalyzed particulate filter and the diesel oxidation catalyst, and wherein the control portion controls flow of the exhaust gas and the engine to raise an exhaust gas temperature in a case that a heating mode enter condition is satisfied.

The heating mode enter condition may be satisfied when a coolant temperature, an exterior temperature of a vehicle, an engine oil temperature, and the exhaust gas temperature at a front portion of the exhaust pipe are respectively higher than predetermined values, and a vehicle speed is slower than a predetermined vehicle speed.

A back pressure control valve may be mounted between the catalyzed particulate filter and the diesel oxidation catalyst on the exhaust pipe, and wherein the control portion is configured to control the flow of the exhaust gas by controlling an operation of the back pressure control valve.

The control portion may determine whether a quick heating condition is satisfied in a case that the heating mode enter condition is satisfied, and the control portion may control the back pressure control valve to reduce amount of the exhaust gas passing through the back pressure control valve and controls the engine to perform a quick heating in a case that the quick heating condition is satisfied.

The quick heating of the engine may be performed by controlling opening of a throttle valve, injection timing of an injector and injection amount thereof according to a first predetermined pattern.

The control portion may open the back pressure control valve and controls the engine to perform a normal heating in a case that the quick heating condition is not satisfied.

The normal heating may be performed by controlling opening of a throttle valve, injection timing of an injector and injection amount thereof according to a second predetermined pattern.

The quick heating condition may be satisfied when the exhaust gas temperature between the catalyzed particulate filter and the diesel oxidation catalyst is lower than a first predetermined temperature.

The normal heating may be continuously performed until a heating mode exit condition is satisfied, wherein the heating mode exit condition is satisfied when the exhaust gas temperature at a front portion of the selective catalyst reduction apparatus is higher than a second predetermined temperature.

The catalyzed particulate filter, the diesel oxidation catalyst, and the selective catalyst reduction apparatus may be sequentially disposed from the engine.

In another aspect of the present invention, the system for purifying an exhaust gas may include a catalyzed particulate filter trapping particulate matters contained in the exhaust gas, a diesel oxidation catalyst oxidizing carbon monoxide and hydrocarbon contained in the exhaust gas, a selective catalyst reduction apparatus reducing nitrogen oxide contained in the exhaust gas, and a dosing module located upstream of the selective catalyst reduction apparatus and dosing a reducing agent into the exhaust gas, wherein the catalyzed particulate filter, the diesel oxidation catalyst, the dosing module, and the selective catalyst reduction apparatus are sequentially mounted on an exhaust pipe from an engine, wherein the system may further include a control portion controlling an operation of the engine, wherein the control portion controls the operation of the engine to raise an exhaust gas temperature in a case that a heating mode enter condition is satisfied, and wherein the control portion controls the engine to reduce amount of the exhaust gas flowing from the catalyzed particulate filter to the diesel oxidation catalyst and to perform a quick heating in a case that a quick heating condition is satisfied.

The control portion may control the engine not to perform an exhaust gas reduction control but to perform a normal heating in a case that the quick heating condition is not satisfied.

A control of raising the exhaust gas temperature may be continuously performed until the exhaust gas temperature at a front portion of the selective catalyst reduction apparatus is higher than a predetermined temperature.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
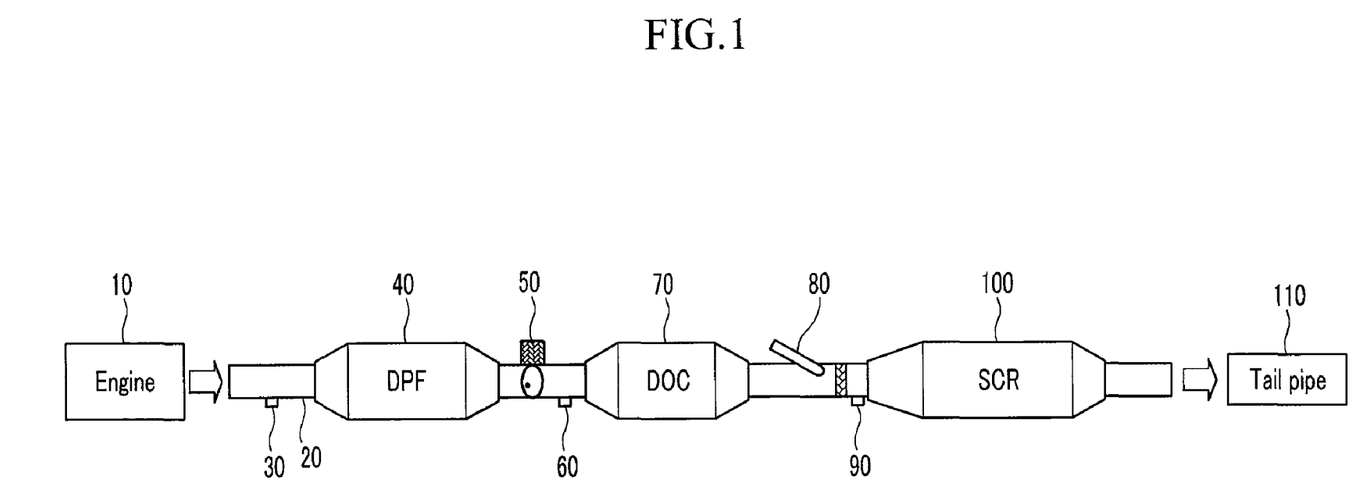
FIG. 1 is a schematic diagram of a system for purifying an exhaust gas according to an exemplary embodiment of the present invention.

FIG. 1 is a schematic diagram of a system for purifying an exhaust gas according to an exemplary embodiment of the present invention.

As shown in FIG. 1, an exhaust gas generated in an engine 10 passes sequentially through a diesel particulate filer (DPF) 40, a diesel oxidation catalyst (DOC) 70, a dosing module 80, and a selective catalyst reduction (SCR) apparatus 100, and noxious materials contained in the exhaust gas are purified in this process. After that, the exhaust gas is exhausted to the exterior through a tail pipe 110. The DPF 40, the DOC 70, the dosing module 80, and the SCR apparatus 100 are mounted on an exhaust pipe 20.

The engine 10 includes a plurality of cylinders for burning an air-fuel mixture. The cylinder is connected to an intake manifold so as to receive the air-fuel mixture, and the intake manifold is connected to an intake pipe so as to receive an air.

In addition, the cylinder is connected to an exhaust manifold, and the exhaust gas generated in a combustion process is gathered in the exhaust manifold. The exhaust manifold is connected to the exhaust pipe 20.

The DPF 40 is mounted downstream of the engine 10. The DPF 40 traps particulate matter (PM) contained in the exhaust gas, and regenerates the trapped PM (i.e., soot). Regeneration of the soot, generally, starts when pressure difference between inlet and outlet of the DPF 40 is greater than a predetermined pressure (about, 20-30 kpa).

In addition, a first temperature sensor 30 is mounted on the exhaust pipe 20 upstream of the DPF 40 and detects an exhaust gas temperature at a front portion of the DPF 40. Here, the exhaust gas temperature will be called an exhaust temperature.

In addition, a back pressure control valve (BPCV) 50 is mounted on the exhaust pipe 20 downstream of the DPF 40 and controls amount of the exhaust gas flowing from the DPF 40 to the DOC 70.

Meanwhile, in order to improve performance of purifying the exhaust gas, an oxidizing catalyst may be coated in the DPF 40.

The DOC 70 is mounted downstream of the DPF 40, and receives the exhaust gas in which the PM is removed from the DPF 40. An oxidizing catalyst is coated in the DOC 70 so as to oxidize hydrocarbon (HC) and carbon monoxide (CO) into carbon dioxide $CO_2$. Platinum or palladium is mainly used for the oxidizing catalyst.

A second temperature sensor 60 is mounted on the exhaust pipe 20 upstream of the DOC 70 and detects the exhaust temperature at a front portion of the DOC 70.

The dosing module 80 is mounted between the DOC 70 and the SCR apparatus 100 and doses a reducing agent into the exhaust gas oxidized in the DOC 70. The reducing agent may be ammonia. Generally, urea is dosed into the exhaust gas by the dosing module 80 and the urea is decomposed into ammonia.

That is, the urea is decomposed into the ammonia ($NH_3$) by following chemical formula.

$$NH_2{}_2CO \rightarrow NH_3 + HNCO$$

$$HNCO + H_2O \rightarrow NH_3 + CO_2$$

The exhaust gas mixed with the reducing agent is supplied to the SCR apparatus 100. In addition, oxidation heat is generated when oxidation reaction proceeds in the DOC 70, and the oxidation heat is also transmitted to the SCR apparatus 100.

The SCR apparatus 100 is mounted downstream of the dosing module 80 and includes zeolite catalyst where transition elements are ion-exchanged. The SCR apparatus 100 reduces nitrogen oxide ($NO_x$) contained in the exhaust gas into nitrogen gas $N_2$ by using the reducing agent so as to remove the $NO_x$ in the exhaust gas.

Reaction equation performed in the SCR apparatus 100 is as follows.

$$4NH_3 + 4NO + O_2 \rightarrow 4N_2 + 6H_2O$$

$$2NH_3 + NO + NO_2 \rightarrow 2N_2 + 3H_2O$$

$$8NH_3 + 6NO_2 \rightarrow 7N_2 + 12H_2O$$

In addition, a third temperature sensor 90 is mounted on the exhaust pipe 20 upstream of the SCR apparatus 100 and detects the exhaust temperature at a front portion of the SCR apparatus 100.

Meanwhile, the DOC 70 may be disposed upstream of the DPF 40.

Figure 2:
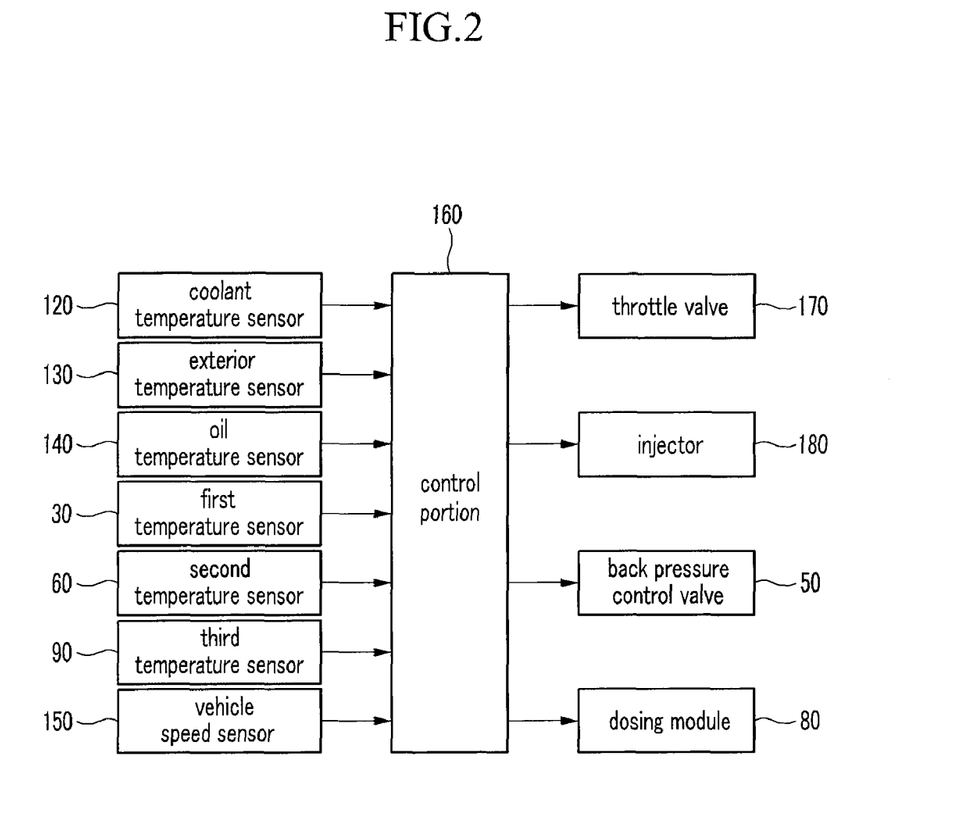
FIG. 2 is a block diagram showing input and output relationships of a control portion controlling a system for purifying an exhaust gas according to an exemplary embodiment of the present invention.

FIG. 2 is a block diagram showing input and output relationships of a control portion controlling a system for purifying an exhaust gas according to an exemplary embodiment of the present invention.

The control portion 160 performs a control of raising the exhaust gas temperature by using control parameters received from respective sensors 120, 130, 140, 30, 60, 90, and 150, and the control of raising the exhaust gas temperature will be described in detail.

A coolant temperature sensor 120 detects a coolant temperature and transmits a signal corresponding thereto to the control portion 160.

An exterior temperature sensor 130 detects a temperature of the exterior of a vehicle and transmits a signal corresponding thereto to the control portion 160.

An oil temperature sensor 140 detects a temperature of engine oil and transmits a signal corresponding thereto to the control portion 160.

The first temperature sensor 30 detects the exhaust temperature at the front portion of the DPF 40 and transmits a signal corresponding thereto to the control portion 160.

The second temperature sensor 60 detects the exhaust temperature at the front portion of the DOC 70 and transmits a signal corresponding thereto to the control portion 160.

The third temperature sensor 90 detects the exhaust temperature at the front portion of the SCR apparatus 100 and transmits a signal corresponding thereto to the control portion 160.

A vehicle speed sensor 150 detects a vehicle speed and transmits a signal corresponding thereto to the control portion 160.

The control portion 160 determines whether a heating mode enter condition is satisfied, whether a quick heating condition is satisfied, and whether a heating mode exit condition is satisfied by using the control parameters.

In addition, the control portion 160 controls a throttle valve 170, an injector 180, the back pressure control valve 50, and the dosing module 80 based on the above determination result.

Control flow performed in the control portion 160 will be described in detail.

Figure 3:
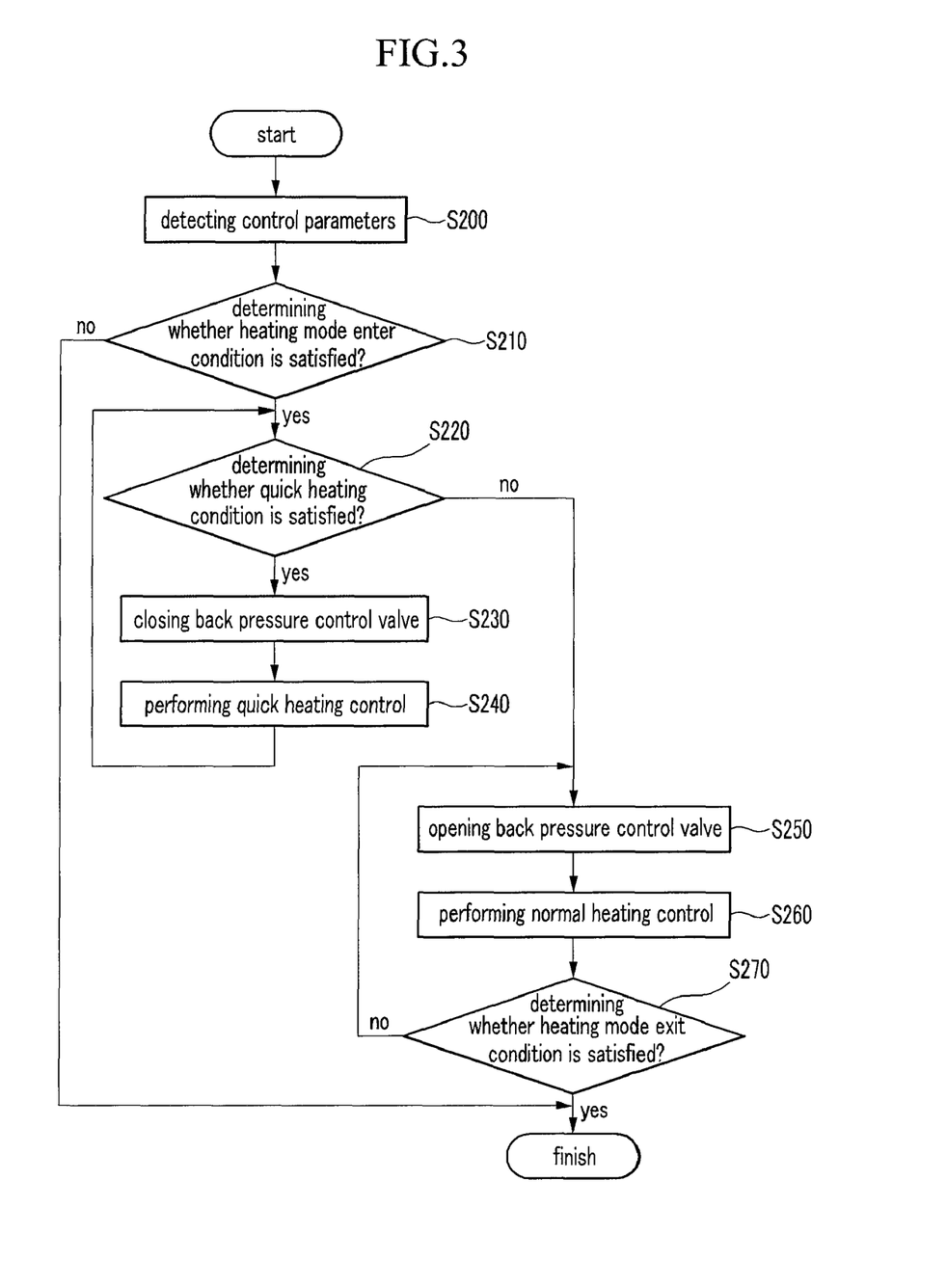
FIG. 3 is a flowchart of controlling an exhaust gas temperature by using a system for purifying an exhaust gas according to an exemplary embodiment of the present invention.

FIG. 3 is a flowchart of controlling an exhaust gas temperature by using a system for purifying an exhaust gas according to an exemplary embodiment of the present invention.

As shown in FIG. 3, the respective sensors 120, 130, 140, 30, 60, 90, and 150 detect control parameters at step S200, and transmit the signals corresponding thereto to the control portion 160.

The control portion 160 determines based on the control parameters whether the heating mode enter condition is satisfied at step S210. The heating mode enter condition is satisfied when the coolant temperature, the exterior temperature of the vehicle, the temperature of the engine oil, and the exhaust temperature at the front portion of the exhaust pipe are respectively higher than predetermined values, and the vehicle speed is slower than a predetermined vehicle speed. That is, the control portion 160 determines whether the engine 10 operates normally by using the coolant temperature, the exterior temperature of vehicle, the oil temperature of the engine, and the exhaust temperature at the front portion of the exhaust pipe, and determines heating of the exhaust gas is needed in a case that the engine 10 operates normally. However, in a case that the vehicle speed is faster than or equal to the predetermined vehicle speed, the control portion 160 determines the heating of the exhaust gas is not needed since the exhaust temperature at the front portion of the SCR apparatus 100 is high.

If the heating mode enter condition is not satisfied at the step S210, the control portion 160 finishes the control of raising the exhaust gas temperature.

On the contrary, if the heating mode enter condition is satisfied at the step S210, the control portion 160 determines whether the quick heating condition is satisfied at step S220. The quick heating condition is satisfied when the exhaust temperature at the front portion of the DOC 70 detected by the second temperature sensor 60 is lower than a first predetermined temperature (e.g., 150° C.).

If the quick heating condition is satisfied at the step S220, the control portion 160 closes the back pressure control valve 50 at step S230, and performs a quick heating control at step S240. If the back pressure control valve 50 is closed, the amount of the exhaust gas flowing from the DPF 40 to the DOC 70 is reduced. According to such an exhaust gas reduction control, the exhaust gas supplied to the DOC 70 is reduced in a range where the engine 10 maintains its ignition-on state.

In addition, the quick heating control is performed by controlling opening of the throttle valve 170, injection timing of the injector 180 (here, both main injector and injector for post-injection), and injection amount according to a predetermined pattern. The predetermined pattern is determined by a lot of experiments and is stored in the control portion 160.

The steps S230 and S240 are continuously performed until the quick heating condition is not satisfied.

The quick heating condition is not satisfied at the step S220, the control portion 160 opens the back pressure control valve 50 at step S250 and performs a normal heating control at step S260. If the back pressure control valve 50 is opened, the amount of the exhaust gas flowing from the DPF 40 to the DOC 70 is not reduced.

In addition, the normal heating control is performed by controlling the opening of the throttle valve 170, the injection timing of the injector 180 (here, both main injector and injector for post-injection), and the injection amount according to another predetermined pattern different from the predetermined pattern of the quick heating control. Another predetermined pattern is determined by a lot of experiments and is stored in the control portion 160.

After that, the control portion 160 determines whether the heating mode exit condition is satisfied at step S270. The heating mode exit condition is satisfied when the exhaust temperature at the front portion of the DOC 100 is higher than a second predetermined temperature (e.g., 200° C.).

If the heating mode exit condition is not satisfied at the step S270, the control portion 160 continuously performs the steps S250 and S260.

If the heating mode exit condition is satisfied at the step S270, the control portion 160 finishes the control of raising the exhaust temperature. That is, since the exhaust temperature at the front portion of DOC 100 is raised to a temperature at which reduction reaction of nitrogen oxide occurs, the control portion 160 does not perform the control of raising the exhaust temperature.

Figure 4:
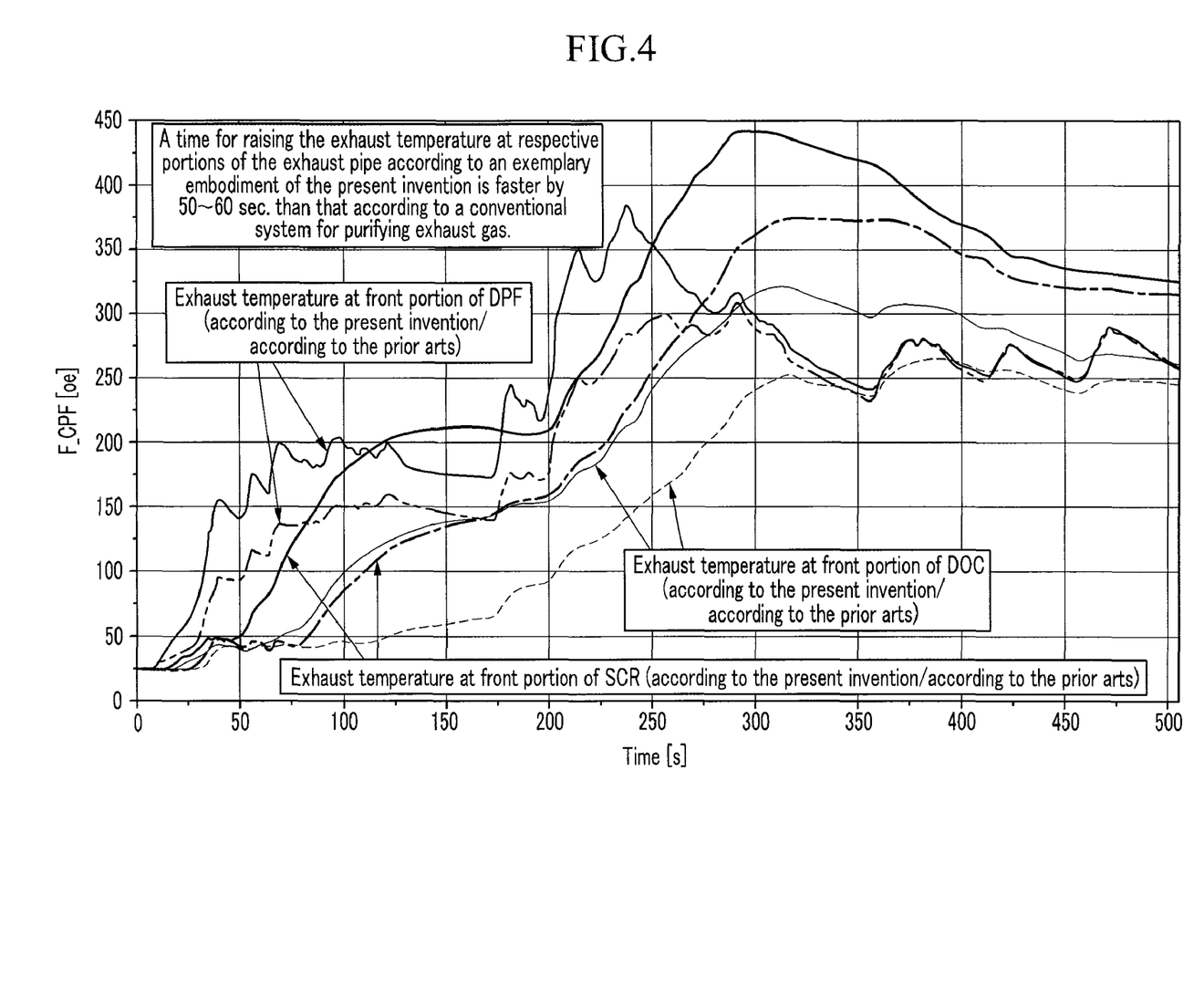
FIG. 4 is a graph showing an exhaust gas temperature at each portion of an exhaust pipe in a case that a system for purifying an exhaust gas according to an exemplary embodiment of the present invention is used.

FIG. 4 is a graph showing an exhaust gas temperature at each portion of an exhaust pipe in a case that a system for purifying an exhaust gas according to an exemplary embodiment of the present invention is used.

As shown in FIG. 4, in a case that a system for purifying the exhaust gas according to an exemplary embodiment of the present invention is used, a time for raising the exhaust temperature at the front portion of the SCR apparatus 100 higher than 200° C. is about 220 seconds. That is, the time for raising the exhaust temperature at the front portion of the SCR apparatus 100 higher than 200° C. according to an exemplary embodiment of the present invention is faster than that according to a conventional system for purifying the exhaust gas by 50-60 seconds. As the time for raising the exhaust temperature at the front portion of the SCR apparatus 100 higher than 200° C. becomes shortened, the performance of purifying the exhaust gas becomes increase.

As described above, exhaust gas temperature downstream of a catalyzed particulate filter may be quickly raised according to an exemplary embodiment of the present invention by controlling amount of an exhaust gas flowing from the catalyzed particulate filter to a diesel oxidation catalyst and performing exhaust gas heating control. Accordingly, the exhaust gas temperature at a front portion of a selective catalyst reduction apparatus may be quickly raised, too.

In addition, since the exhaust gas temperature at the front portion of the selective catalyst reduction apparatus is quickly raised, performance of purifying the exhaust gas may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for purifying an exhaust gas comprising:
a diesel catalyzed particulate filer (DPF) trapping particulate matters (PM) contained in the exhaust gas;
a diesel oxidation catalyst (DOC) oxidizing carbon monoxide and hydrocarbon contained in the exhaust gas, a selective catalyst reduction (SCR) apparatus reducing nitrogen oxide contained in the exhaust gas;
a dosing module located upstream of the selective catalyst reduction apparatus and dosing a reducing agent into the exhaust gas; and
an electronic control unit;
wherein the catalyzed particulate filter, the diesel oxidation catalyst, the selective catalyst reduction apparatus, and the dosing module are mounted on an exhaust pipe, and the selective catalyst reduction apparatus is mounted downstream of the catalyzed particulate filter and the diesel oxidation catalyst; and
wherein a back pressure control valve is mounted between the catalyzed particulate filter and the diesel oxidation catalyst on the exhaust pipe; and
wherein the electronic control unit is configured to control the flow of the exhaust gas by controlling an operation of the back pressure control valve when a heating mode enter condition is satisfied.

2. The system of claim 1, wherein the electronic control unit determines whether a quick heating condition is satisfied when the heating mode enter condition is satisfied, and
wherein the electronic control unit controls the back pressure control valve to reduce amount of the exhaust gas passing through the back pressure control valve and controls the engine to perform a quick heating when the quick heating condition is satisfied.

3. The system of claim 2, wherein the quick heating of the engine is performed by controlling opening of a throttle valve, injection timing of an injector and injection amount thereof according to a first predetermined pattern.

4. The system of claim 2, wherein the electronic control unit opens the back pressure control valve and controls the engine to perform a normal heating when the quick heating condition is not satisfied.

5. The system of claim 4, wherein the normal heating is performed by controlling opening of a throttle valve, injection timing of an injector and injection amount thereof according to a second predetermined pattern.

6. The system of claim 2, wherein the quick heating condition is satisfied when the exhaust gas temperature between the catalyzed particulate filter and the diesel oxidation catalyst is lower than a first predetermined temperature.

7. The system of claim 4, wherein the normal heating is continuously performed until a heating mode exit condition is satisfied.

8. The system of claim 7, wherein the heating mode exit condition is satisfied when the exhaust gas temperature at a front portion of the selective catalyst reduction apparatus is higher than a second predetermined temperature.

9. The system of claim 1, wherein the catalyzed particulate filter, the diesel oxidation catalyst, and the selective catalyst reduction apparatus are sequentially disposed from the engine.

10. The system of claim 1, wherein the heating mode enter condition is satisfied when a coolant temperature, an exterior temperature of a vehicle, an engine oil temperature, and the exhaust gas temperature at a front portion of the exhaust pipe are respectively higher than predetermined values, and a vehicle speed is slower than a predetermined vehicle speed.

11. A system for purifying an exhaust gas comprising:
   a catalyzed particulate filter trapping particulate matters contained in the exhaust gas,
   a diesel oxidation catalyst oxidizing carbon monoxide and hydrocarbon contained in the exhaust gas,
   a selective catalyst reduction apparatus reducing nitrogen oxide contained in the exhaust gas, and
   a dosing module located upstream of the selective catalyst reduction apparatus and dosing a reducing agent into the exhaust gas,
   wherein the catalyzed particulate filter, the diesel oxidation catalyst, the dosing module, and the selective catalyst reduction apparatus are sequentially mounted on an exhaust pipe from an engine,
   wherein a back pressure control valve is mounted in the exhaust pipe;
   wherein the system further comprises an electronic control unit, and
   wherein the electronic control unit is configured to reduce amount of the exhaust gas flowing from the catalyzed particulate filter to the diesel oxidation catalyst and to perform a quick heating by controlling the back pressure control valve when a heating mode enter condition is satisfied and a quick heating condition is satisfied.

12. The system of claim 11, wherein the electronic control unit is configured not to perform an exhaust gas reduction control but to perform a normal heating when the quick heating condition is not satisfied.

13. The system of claim 12, wherein a control of raising the exhaust gas temperature is continuously performed until the exhaust gas temperature at a front portion of the selective catalyst reduction apparatus is higher than a predetermined temperature.

14. The system of claim 11, wherein the back pressure control valve is mounted in the exhaust pipe between the catalyzed particulate filter and the diesel oxidation catalyst on the exhaust pipe.

* * * * *